United States Patent [19]
Ramesh

[11] Patent Number: 6,130,297
[45] Date of Patent: Oct. 10, 2000

[54] COMPOSITION OF POLYEPOXIDE, 1,3,5-TRIS-(2-CARBOXYETHYL) ISOCYANURATE AND DICARBOXYLIC ACID

[75] Inventor: Subban Ramesh, Parsippany, N.J.

[73] Assignee: Cytec Technology Corp., Wilmington, Del.

[21] Appl. No.: 09/222,098

[22] Filed: Dec. 29, 1998

Related U.S. Application Data

[62] Division of application No. 08/944,659, Oct. 6, 1997, Pat. No. 5,925,285.
[60] Provisional application No. 60/028,262, Oct. 8, 1996.

[51] Int. Cl.$^7$ .......................... C08G 59/42; C08L 33/14; C08L 63/00
[52] U.S. Cl. ................. 525/327.3; 252/182.28; 525/533
[58] Field of Search .............. 252/182.12, 182.21, 252/182.28, 182.23; 525/327.3, 533

[56] References Cited

U.S. PATENT DOCUMENTS

| | | | |
|---|---|---|---|
| 2,872,427 | 2/1959 | Schroeder | 260/29.2 |
| 3,235,553 | 2/1966 | Sadle | 260/248 |
| 3,485,833 | 12/1969 | Sadle | 260/248 |
| 3,730,930 | 5/1973 | Labana | 260/23 EP |
| 3,752,870 | 8/1973 | Labana | 260/836 |
| 3,781,380 | 12/1973 | Labana et al. | 260/836 |
| 3,787,521 | 1/1974 | Labana et al. | 260/836 |
| 4,011,381 | 3/1977 | Iwasawa et al. | 526/56 |
| 4,181,642 | 1/1980 | Holle et al. | 260/37 EP |
| 4,344,876 | 8/1982 | Berner | 524/91 |
| 4,346,144 | 8/1982 | Craven | 428/335 |
| 4,607,069 | 8/1986 | Tesch et al. | 523/400 |
| 4,619,956 | 10/1986 | Susi | 524/87 |
| 4,650,718 | 3/1987 | Simpson et al. | 428/413 |
| 4,681,811 | 7/1987 | Simpson et al. | 428/413 |
| 4,703,101 | 10/1987 | Singer et al. | 528/87 |
| 4,764,430 | 8/1988 | Blackburn et al. | 428/413 |
| 4,855,386 | 8/1989 | Bauer | 528/117 |
| 5,001,173 | 3/1991 | Anderson et al. | 523/406 |
| 5,106,891 | 4/1992 | Valet | 524/91 |
| 5,116,892 | 5/1992 | Barbee et al. | 524/99 |
| 5,118,729 | 6/1992 | Piechocki | 523/404 |
| 5,321,103 | 6/1994 | Renner | 525/515 |
| 5,322,868 | 6/1994 | Valet et al. | 524/89 |
| 5,380,804 | 1/1995 | Lees et al. | 525/327.3 |
| 5,461,151 | 10/1995 | Waterman | 544/216 |

FOREIGN PATENT DOCUMENTS

| | | |
|---|---|---|
| 0256369 A2 | 2/1988 | European Pat. Off. . |
| 0434608 A1 | 6/1991 | European Pat. Off. . |
| 0444323 A2 | 9/1991 | European Pat. Off. . |
| 0444323 A3 | 9/1991 | European Pat. Off. . |
| 0480120 A2 | 4/1992 | European Pat. Off. . |
| 0480120 A3 | 4/1992 | European Pat. Off. . |
| 0704437 A2 | 4/1996 | European Pat. Off. . |
| 59-107742 | 6/1984 | Japan . |
| 61-087767 | 5/1986 | Japan . |
| 61-087768 | 5/1986 | Japan . |
| 61-087769 | 5/1986 | Japan . |
| WO 92/19660 | 11/1992 | WIPO . |
| WO 94/06876 | 3/1994 | WIPO . |

OTHER PUBLICATIONS

Chemical abstracts accession no. 1974:506357, Fedorenko et al., "Hardening of epoxy resin by carboxyethyl isocyanurates," Sin. Fiz.–Khim. Polim., 1974, vol. 13, pp. 41–43.
Chemical abstracts accession no. 1976:59348, Sarzhevskaya et al., "Curing of epoxy resins by 1,3,5–tricarboxyethyl isocyanurate," Khim. Tekhnol., 1976, vol. 3, pp. 36–39.

*Primary Examiner*—Robert E. Sellers
*Attorney, Agent, or Firm*—Michelle A. Sherwood; Claire M. Schultz; Michael J. Kelly

[57] ABSTRACT

A crosslinker composition based on a combination of 1,3,5-tris-(2-carboxyethyl)isocyanurate and a dicarboxylic acid crosslinking agent is provided. Also provided is a curable epoxy composition employing, as the crosslinker component, a combination of 1,3,5-tris-(2-carboxyethyl) isocyanurate and a dicarboxylic acid crosslinking agent, which curable composition finds use, for example, in coating applications.

18 Claims, No Drawings

COMPOSITION OF POLYEPOXIDE, 1,3,5-TRIS-(2-CARBOXYETHYL) ISOCYANURATE AND DICARBOXYLIC ACID

This application claims priority under 35 U.S.C. §119 from U.S. Provisional Application Serial No. 60/028,262 (filed Oct. 8, 1996), which is incorporated by reference herein as if fully set forth. This application is a Division of application U.S. Ser. No. 08/944,659 (filed Oct. 6, 1997), U.S. Pat. No. 5,925,285.

BACKGROUND OF THE INVENTION

1. Field of the Invention

The present invention relates in general to a carboxy-functional crosslinker composition comprising (i) 1,3,5-tris-(2-carboxyethyl)isocyanurate and/or a salt thereof, and (ii) a dicarboxylic acid crosslinking agent and/or a salt thereof. This invention also relates to curable compositions which produce durable, low-gloss films upon curing. In accordance with the present invention, the curable composition comprises, in its broadest concept, (i) a backbone resin component comprising a polyfunctional epoxy compound; and (2) a carboxy-functional crosslinker component comprising (i) 1,3,5-tris-(2-carboxyethyl)isocyanurate crosslinker and/or a salt thereof, and (ii) a dicarboxylic acid crosslinking agent and/or a salt thereof.

2. Description of the Related Art

Coatings prepared by curing polyepoxides with polybasic acid crosslinking agents (including the salts thereof) have been described in numerous references, including U.S. Pat. No. 3,730,930, U.S. Pat. No. 3,752,870, U.S. Pat. No. 3,781,380, U.S. Pat. No. 3,787,521, U.S. Pat. No. 4,181,642, U.S. Pat. No. 4,346,144, U.S. Pat. No. 4,650,718, U.S. Pat. No. 4,681,811, U.S. Pat. No. 4,703,101, U.S. Pat. No. 4,764,430, JP-A-61087767, JP-A-61087768, and JP-A-61087769, all of which are incorporated by reference herein as if fully set forth. One of the more common such polybasic acid crosslinking agents is 1,12-dodecanedioic acid. The coatings described in these references are said to have certain advantageous characteristics such as, for example, distinctness of image, good adhesion and high gloss.

U.S. Pat. No. 5,380,804 (also incorporated by reference herein as if fully set forth) describes liquid and powder coatings which employ 1,3,5-tris-(2-carboxyethyl) isocyanurate (hereinafter referred to as "TCI") as a polybasic acid (carboxy-functional) crosslinking agent for epoxy backbone resins. Films derived from the disclosed coatings are said to possess excellent hardness and resistance properties in comparison to films derived from commonly used carboxy-functional crosslinkers such as 1,12-dodecanedioic acid. The films are also described as possessing high gloss.

While hard, resistant, high gloss films are preferred for certain uses, such as automotive topcoats, a number of lower gloss applications for hard, resistant films also exist. It would, therefore, be highly desirable in these lower gloss end uses to benefit from the outstanding hardness and resistance properties imparted to crosslinked films by TCI.

SUMMARY OF THE INVENTION

It has now been surprisingly discovered that lower gloss TCI-crosslinked epoxy films can be achieved by using a dicarboxylic acid co-crosslinker in combination with TCI. The effect of the crosslinker combination is indeed surprising because, as discussed above and as further exemplified herein, the use of each of type of crosslinker individually results in a glossier finish.

In accordance with the present invention, therefore, there is provided a novel carboxy-functional crosslinker composition comprising:

(i) 1,3,5-tris-(2-carboxyethyl)isocyanurate and/or a salt thereof; and (ii) a dicarboxylic acid crosslinking agent and/or a salt thereof.

This novel carboxy-functional crosslinker composition can be used in combination with a polyfunctional epoxy compound (polyepoxide) to formulate coating compositions which, when cured under standard conditions, provide crosslinked, hard, resistant, lower gloss films.

The present invention also includes a curable compositions, such as liquid and powder coating compositions, comprising:

(a) a carboxy-functional crosslinker component comprising (i) 1,3,5-tris-(2-carboxyethyl) isocyanurate and/or a salt thereof, and (ii) a dicarboxylic acid crosslinking agent and/or a salt thereof; and (b) a backbone resin component comprising a polyfunctional epoxy compound (polyepoxide).

As indicated above, when cured these curable compositions of the invention produce films with reduced gloss relative to films prepared by using either 1,3,5-tris-(2-carboxyethyl) isocyanurate or the dicarboxylic acid crosslinker alone.

The present invention also provides a method of coating a substrate with a low gloss film by applying onto a substrate the curable coating composition as described above then heat curing the so-applied coating.

Still further, the present invention is a crosslinked film derived from the curable coating compositions of the present invention, and an article coated with such a crosslinked film, such crosslinked films possessing excellent hardness, impact and solvent resistance and also have the desired characteristic of a smooth low gloss finish.

These and other features and advantages of the present invention will be more readily understood by those of ordinary skill in the art from a reading of the following detailed description.

DETAILED DESCRIPTION OF THE PREFERRED EMBODIMENTS 1,3,5-tris-(2-carboxyethyl)isocyanurate (TCI)

TCI is a known compound represented by the formula:

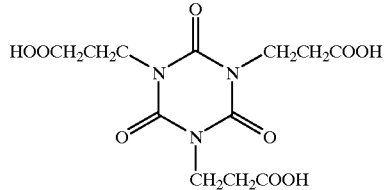

TCI can be prepared from cyanuric acid and acrylonitrile by any of the procedures described in U.S. Pat. No. 3,485,833 and U.S. Pat. No. 3,235,553, incorporated herein for all purposes as if fully set forth, as well as previously incorporated U.S. Pat. No. 5,380,804. TCI is a solid at ambient temperature having a melting point of 226°–228° C.

Dicarboxylic Acid Crosslinking Agents

The dicarboxylic acid crosslinking agents suitable for use in the present invention are those suitable for use in coatings and other applications as crosslinkers for epoxy resins. Such dicarboxylic acid crosslinking agents, in general, are well-known to persons of ordinary skill in the relevant art, and numerous varieties are generally commercially available.

Such dicarboxylic acids may in general be represented by the formula:

wherein A is a hydrocarbylene anchor. The preferred dicarboxylic acids are monomeric in nature, wherein A is a hydrocarbylene group of 1 to 22 carbon atoms. By "hydrocarbylene" is meant a divalent group containing carbon and hydrogen atoms including, for example, alkylene (straight and branched chain), aralkylene, alkenylene and arylene, as well as corresponding variations containing heteroatoms such as di(alkyl)oxy and di(aryl)oxy; di(alkyl)carbonyl and di(aryl)carbonyl; hydroxy-substituted alkylene, aralkylene, alkenylene and arylene; and heterocyclics such as furanylene.

As specific examples of suitable dicarboxylic acids for use in the present invention may be mentioned 1,3-acetonedicarboxylic acid, adipic acid, azelaic acid, 4,4'-biphenyldicarboxylic acid, 1,1-cyclohexanediacetic acid, 1,4-cyclohexanedicarboxylic acid, 1,14-tetradecanedioic acid, diglycolic acid, 2,2-dimethylglutaric acid, 3,3-dimethylglutaric acid, dimethylmalonic acid, 2,2-dimethylsuccinic acid, 2,3-dimethylsuccinic acid, 3,3'-dithiodipropionic acid, 1,12-dodecanedioic acid, ethylmalonic acid, 3-ethyl-3-methylglutaric acid, 2-ethyl-2-methylsuccinic acid, fumaric acid, 3,4-furandicarboxylic acid, glutaric acid, 1,16-hexadecanedioic acid, homophthalic acid, maleic acid, malic acid, malonic acid, 3-methyladipic acid, 3-methylglutaric acid, methylmalonic acid, methylsuccinic acid, naphthalenedicarboxylic acid, oxalic acid, ortho-, meta-, and para-phthalic acid, pimelic acid, sebacic acid, suberic acid, succinic acid, tartaric acid, 1,11-undecanedioic acid and mixtures thereof. Preferred for use in the present invention are 1,12-dodecanedioic acid (DDA) and dl-malic acid.

The cyclic anhydrides of such dicarboxylic acids (where they exist) are also suitable for use herein, as are dicarboxylic oligomers of such dicarboxylic acids with other monomeric species, and dicarboxylic prepolymers of such dicarboxylic acids with diepoxides. For the purposes of the present invention, these additional embodiments are included within the meaning of dicarboxylic acid crosslinking agent in its broadest concept.

The particular choice of dicarboxylic acid will, of course, depend on a number of factors recognizable to those of ordinary skill in the relevant art including, but not limited to, the desired cure temperature of the final formulated system. For example, the person of ordinary skill in the art would clearly recognize that a dicarboxylic acid which decomposes at relatively low temperatures would not be suitable for high temperature cure applications.

Acid Salts

A person of ordinary skilled in the art will also recognize that the organic or inorganic salts of the acids described above can be used in the place of the free acids or in combination therewith to effectively produce the low gloss coatings of the invention. The organic or inorganic salts of the above carboxylic acids can be prepared by admixing the carboxylic acid and a suitable base capable of producing the cationic portion of the desired salt. The salt may be isolated and introduced into the coating composition or it may be generated "in situ" by adding the base to the coating composition.

As examples of the organic salts may be mentioned salts of amines such as ammonia, alkylamines, dialkylamines, trialkylamines, aralkylamines, cyclic amines, aromatic amines, arylamines and the like. Preferred are salts of ammonia, trimethylamine, triethylamine, tripropylamine, tributylamine, tribenzylamine, 1,4-diaza-(2.2.2)-bicyclooctane (DABCO), pyrrolidine, piperidine, morpholine, N-methylimidazole, 2-phenyl-2-imidazoline and 4-N,N-dimethylaminopyridine. Suitable examples of inorganic salts include lithium, sodium and potassium salts.

The Carboxy-Functional Crosslinker Composition

As mentioned above, one aspect of the present invention is directed to a carboxy-functional crosslinker composition which can be used in curable compositions to prepare low gloss epoxy coatings. The carboxy-functional crosslinker composition comprises: (i) 1,3,5-tris-(2-carboxyethyl) isocyanurate (TCI) and/or a salt thereof; and (ii) a dicarboxylic acid crosslinking agent and/or a salt thereof. As indicated by "and/or," (i) and (ii) are present either as free acids, or as their salts, or as mixtures of free acids and their salts.

When utilized in powder coating compositions, these crosslinker compositions are preferably solid at ambient temperature, and more preferably are solid at about 40° C., to preserve the powdery state of the curable composition and prevent lumping. In powder coating applications, non-solid or semi-solid materials are also useable if, for example, they are adsorbed on organic and inorganic solid supports such as, for example, disclosed in U.S. Pat. No. 5,321,103 (incorporated by reference herein as if fully set forth), including supports comprising colloidal condensation polymers. The preferred weight ratios of (i):(ii) to obtain greatest gloss reduction are in the range of from about 10:90 to about 98:2, more preferably from about 20:80 to about 98:2, still more preferably from about 30:70 to about 95:5, and especially from about 50:50 to about 90:10.

The Backbone Resin Component

As indicated above, the backbone resin component (b) comprises a polyfunctional epoxy compound (polyepoxide), that is, containing on average at least two, and preferably greater than two, epoxy groups per molecule. As suitable polyepoxides usable in the curable compositions of the present invention may be mentioned those of the following general formula:

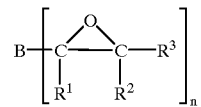

wherein B is an n-functional monomeric, oligomeric or polymeric anchor having n-epoxy groups pendently or terminally attached thereto, and wherein $R^1$, $R^2$ and $R^3$ are the same or different and each is selected from the group consisting of hydrogen, $C_1$–$C_4$ alkyl, $C_6$–$C_{10}$ aryl, $C_7$–$C_{11}$ aralkyl and a mixture thereof (and preferably wherein each is hydrogen), and wherein n is, on average, at least 2 and preferably greater than 2.

The polyfunctional epoxy backbone resin component in the curable compositions of the present invention contains, on average, at least two and preferable more than two epoxy functionalities per molecule, and includes polyfunctional epoxy group containing materials which are monomeric, oligomeric, polymeric or a mixture thereof. Such polyfunctional epoxy compounds are in general well-known to those of ordinary skill in the art, as exemplified by the following references: U.S. Pat. No. 2,872,427, U.S. Pat. No. 3,730,930, U.S. Pat. No. 3,752,870, U.S. Pat. No. 3,781,380, U.S. Pat. No. 3,787,521, U.S. Pat. No. 4,011,381, U.S. Pat. No. 4,346,144, U.S. Pat. No. 4,607,069, U.S. Pat. No. 4,650,718, U.S. Pat. No. 4,681,811, U.S. Pat. No. 4,703,101, U.S. Pat. No. 4,764,430, U.S. Pat. No. 4,855,386, U.S. Pat. No. 5,001,173, U.S. Pat. No. 5,116,892, U.S. Pat. No. 5,118,729, WO92/19660 and WO94/06876, which references are herein incorporated by reference for all purposes as if fully set forth.

As specific examples of monomeric polyfunctional epoxy compounds may be mentioned difunctional epoxy resins (bisepoxides) including glycidyl ethers of dihydric phenols like the bisphenol-A/epichlorohydrin reaction products such as diglycidyl bisphenol-A; vinyl cyclohexene diepoxides such as 4-vinyl-1-cyclohexene diepoxide; 1,2,5,6-diepoxycyclooctane; 1,2,7,8-diepoxyoctane; dicyclopentadiene diepoxide; 1,4-divinyl benzene diepoxide; cyclohexene-4-methyl cyclohexene-4-carboxylate diepoxide; glycidylated diol type polyfunctional epoxy group containing materials such as hexane diol diglycidyl ether, ethylene glycol diglycidyl ether, diethylene glycol diglycidyl ether, triethylene glycol diglycidyl ether and the like. Other suitable monomeric polyfunctional epoxy compounds include trifunctional epoxy resins (trisepoxides) such as tri-(4-glycidyl oxyphenyl)methane and triglycidyl isocyanurate; and higher polyfunctional epoxides such as glycidylated pentaerythritol and sorbitol. As a commercially available example of bisphenol-A/epichlorohydrin reaction products may be mentioned epoxy resins sold under the trade designation Epon® of Shell Chemical Company (Houston, Tex.) such as Epon® 828 resin having an equivalent weight in the range of 185 to 192. As a commercially available example of a glycidylated sorbitol may be mentioned the substantially monomeric glycidylated sorbitol known as Synocure® 888 H resin (Cook Composites and Polymers Company, Port Washington, Wis.).

The oligomeric polyfunctional epoxy group containing materials include oligomeric forms of the monomeric materials, oligomers of diepoxides such as low molecular weight bisphenol-A oligomers, prepolymers thereof, reaction products of amines with diepoxides, and the like.

The polymeric polyfunctional epoxy group containing materials include, for example, polymers of epoxy group containing unsaturated monomers and copolymers thereof with unsaturated comonomers which do not contain epoxy groups. As examples of the epoxy group containing unsaturated monomers may be mentioned glycidyl acrylate, glycidyl methacrylate and allyl glycidyl ether. As examples of the unsaturated comonomers which do not contain epoxy groups may be mentioned the alkyl esters of acrylic and methacrylic acid containing from 1 to 20 carbon atoms in the alkyl group, such as methyl acrylate, ethyl acrylate, butyl acrylate, ethylhexyl acrylate, methyl methacrylate, ethyl methacrylate, butyl methacrylate and ethylhexyl methacrylate; vinyl aromatic compounds such as styrene, methyl styrene and vinyl toluene; vinyl and vinylidene halides such as vinyl and vinylidene chlorides, vinyl esters such as vinyl acetate; allyl alcohol; and hydroxyalkyl acrylates and methacrylates containing from 1 to 20 carbon atoms in the hydroxyalkyl group, such as hydroxyethyl acrylate, hydroxyethyl methacrylate, hydroxypropyl acrylate, hydroxypropyl methacrylate and the like.

The copolymerization reaction of epoxy group containing unsaturated monomers with epoxy-free ethylenically unsaturated monomers is preferred and may be carried out by known methods such as that described in various of the aforementioned incorporated references as well as in U.S. Pat. No. 3,787,521, U.S. Pat. No. 4,181,642, EP-A-0480120 and EP-A-0256369, which are also incorporated by reference herein as if fully set forth. For example, preferred epoxy group-containing monomers such as glycidyl acrylate, glycidyl methacrylate, or mixtures thereof, can be copolymerized with one or more epoxy-free ethylenically-unsaturated monomers, preferably selected from the group consisting of acrylic acid esters with alcohols of 1 to 20 carbon atoms, methacrylic acid esters with alcohols of 1 to 20 carbon atoms, hydroxyethyl acrylate and methacrylate, hydroxypropyl acrylate and methacrylate, acrylic and methacrylic acid, acrylonitrile, methacrylonitrile, acrylamide, methacrylamide, styrene, alpha-methyl styrene, methyl styrene, ethyl styrene, vinyl acetate, vinyl chloride, vinylidene chloride, dialkyl maleates having alkyls of 1 to 20 carbon atoms, dialkyl fumarates having alkyls of 1 to 20 carbon atoms, maleic anhydride, vinyl toluene, and a mixture thereof. The preferred epoxy-free monomer is selected from the group consisting essentially of methyl acrylate, methyl methacrylate, butyl acrylate, butyl methacrylate, ethylhexyl acrylate, ethylhexyl methacrylate, styrene, and a mixture thereof. The copolymerization reaction may be carried out by known methods such as those described in previously incorporated U.S. Pat. No. 3,787,521, U.S. Pat. No. 4,181,642, EP-A-0480120 and EP-A-0256369. The preferred molecular weight (weight average—Mw) of the polyepoxide is in the range of from about 1,000 to about 30,000. The epoxy equivalent weight is typically from about 50 to about 5,000 and the glass transition temperature (Tg) is from about −20° C. to about +120° C.

Commercially available examples of glycidyl methacrylate copolymer type polyfunctional epoxy group containing materials include Synthacryl® VCS 1436 resin a product of Hoechst-Celanese Corporation, Charlotte, N.C.; Estron® GMA-252 resin (Mw: 8300; EW: 250; Tg: 36), a product of Estron Chemicals, Calvert City, Ky.; Almatex® PD 7110, Almatex® PD 7210, Almatex® PD7310, Almatex® PD 7610 (Mw: 7000; EW: 510; Tg: 45) and Almatex® PD 1700 resins, products of Mitsui Toatsu Company, Inc. of Japan, and available from Anderson Development Company, Adrian, Mich.; and Blemmer® CP-15 (Mw: 12300; EW: 1000; Tg: 63), Blemmer® CP-30 P (Mw: 10300; EW: 530; Tg: 62) and Blemmer® CP-5 SA (Mw: 10100; EW: 3000; Tg: 96) resins, products of Nippon Oil and Fat Corporation of Japan.

Optional Ingredients

In addition to the crosslinker and backbone resin components described in detail above, the curable compositions of the present invention may optionally comprise a variety of additional ingredients normal for any particular chosen end use. One common such additional ingredient is a cure catalyst for increasing the cure temperature and/or for cure time of the systems described herein.

If present, the cure catalyst is selected from the general groups of basic and nucleophilic compounds, and include phosphines, phosphites, amines, oxides, alkoxides, hydroxides, carbonates, carboxylic salts, quaternary salts and the like. Examples of suitable catalysts include alkyl phosphines such as tri-n-octyl phosphine, aryl phosphines such as triphenyl phosphine, alkyl phosphites such as tri-n-octyl phosphite, tertiary amines such as 1,4-diaza-(2.2.2)-bicyclooctane (DABCO), heterocyclic amines such as N-methyl imidazole and 4-N,N-dimethylaminopyridine, metal oxides, metal hydroxides, metal carbonates, carboxylic acid salts, quaternary salts such as triphenylphosphonium bromide, trimethyl benzylammonium chloride, and trimethylbenzylammonium bromide, metal alkoxides, such as sodium methoxide or potassium tertiary butoxide, and a mixture thereof. Triphenylphosphine and DABCO are the preferred cure catalysts.

The present curable compositions may also contain a solvent of the type typically found in coatings applications including, for example, alcohols, ketones, esters, aliphatic hydrocarbons, aromatic hydrocarbons, halogenated hydrocarbons and the like. In waterborne coating applications, the curable compositions may contain, in addition to water, a co-solvent and an aqueous dispersion promoting material such as ethylhexanol, Texanol® (a C8-hydroxyalkyl ester of methylpropionic acid commercially available from Eastman Chemical Company), surfactants and other related materials.

Other optional ingredients may be additionally used depending on the particular application. For example, well known auxiliaries and additives typically utilized in the coatings industry include foam inhibitors, leveling aids, pigments, dispersants such as pigment dispersing aids, dyes, UV absorbers (including hydroxy aryl triazine types (such as CYAGARD® UV 1164 of Cytec Industries Inc.), benzotriazole types and benzophenone types), heat stabilizers, other stabilizing additives such as antioxidants, hindered amine light stabilizers (such as Sanduvor® 3058 of Clariant) and the like. Other such optional ingredients have been exemplified in the many previously incorporated references, and reference may be had thereto for further details. Reference may specifically be had to U.S. Pat. No. 4,344,876, U.S. Pat. No. 4,619,956, U.S. Pat. No. 5,106,891, U.S. Pat. No. 5,322,868, U.S. Pat. No. 5,461,151, EP-A-0434608, EP-A-0444323 and EP-A-0704437, all of which are incorporated by reference herein as if fully set forth, for detailed discussions of the stabilization of coatings and other curable compositions with UV absorbers, hindered amine light stabilizers and/or other types of light stabilizers.

Specifically, for powder coating compositions, conventional additives well known to those of ordinary skill in the art may be employed. Included among these are additives such as fillers, antioxidants, ultraviolet light stabilizers, pigments such as, for example, $TiO_2$ pigment, flow control agents, plasticizers, mold release agents, corrosion inhibitors, and the like. Additives such as benzoin, Modaflow® Powder III Resin Modifier (Monsanto), or Resiflow® P-67 Flow Control Agent (Estron Chemical, Inc.) are preferably incorporated into the powders at about 1 to 4 weight percent level based on the total powder coating weight.

Ratios and Proportions of Components

As indicated above, it has been surprisingly discovered that when a combination of 1,3,5-tris-(2-carboxyethyl) isocyanurate and a dicarboxylic acid crosslinking agent is used as the crosslinker composition for polyepoxides, a reduction in the gloss of the cured coatings can be achieved relative to coatings prepared by using either 1,3,5-tris-(2-carboxyethyl)isocyanurate or the dicarboxylic acid crosslinking agent alone. Preferred ratios of 1,3,5-tris-(2-carboxyethyl)isocyanurate to dicarboxylic acid crosslinking agent have been discussed above.

The weight ratio of the polyepoxide backbone resin to the carboxyl-functional crosslinker component in the curable compositions of the present invention is determined primarily by the epoxy equivalent weight of the polyepoxide. Thus, for a given carboxy-functional crosslinker, higher levels of the crosslinking agent are required when the polyepoxide used contains a higher epoxy content. Usually, if a catalyst is employed, higher levels of the cure catalyst are also needed in such cases.

As a general rule, the resin component and the crosslinker component are admixed in an equivalents ratio (equivalents of epoxy to carboxy functionality) of from about 0.5:1 to about 2:1, and more preferably from about 0.8:1 to about 1.2:1. Typically, this results in a weight ratio of the polyepoxide (b) to the crosslinker component (a) in the range of from about 90:10 to about 60:40, but more preferably, the ratio is in the range of from about 90:10 to about 75:25.

The amount of catalyst, if present, is typically in the range of from about 0.01 weight percent to about 5.0 weight percent of the total weight of the curable composition.

Preparation and Uses of the Curable Compositions

The curable compositions of the present invention are suitable for numerous uses including, for example, as coatings and adhesives, in decorative laminated boards, and in the formation of crosslinked molded articles such as engineering composites. The curable compositions may be prepared by admixing the various components via methods and in relative amounts which are recognizable by those of ordinary skill in the art in the relevant field depending upon the particular end use chosen.

An especially preferred use of the curable compositions in accordance with the present invention is in the coatings field. Any conventional type of coating may be prepared using the curable compositions described herein, including organic solvent based liquid coatings, waterborne coatings and powder coatings. In coatings applications, the weight amounts of crosslinker component and polyfunctional epoxy compound will be dependent upon factors including, for example, the particular materials chosen, the presence of other reactive species as well as the desired end use. Based upon these variables and others, those of ordinary skill in the art should be able to adjust the composition of the coatings (including the relative amounts of the components) to achieve the desired effect.

Organic solvent based liquid coatings in accordance with the present invention may be prepared via conventional means by adding into a commonly used organic coatings solvent the components of the curable composition and the optional ingredients, if present, in any convenient order. In organic solvent based coatings, the systems are formulated to produce a solids content level suitable for convenient application with minimal material loss, preferably at a solids content level in the range of from about 20 weight percent to about 85 weight percent, and more preferably at a solids content level in the range of from about 45 weight percent to about 80 weight percent, depending on the method of application chosen.

Waterborne coating compositions in accordance with the present invention may be prepared by combining the components of the coating in any particular order, but it is preferred to do so by preparing a dispersible composition by substantially homogeneously mixing the coating components with a surface active material (which may be an inherent property of the resin component), then dispersing the dispersible composition in an aqueous medium, which may comprise solely water or may contain other components such as minor amounts of water-miscible co-solvents to ease dispersion or adjust viscosity. The waterborne coating compositions may be formulated to various solids contents, generally ranging from about 20% to about 75% by weight solids, but preferably in the range of from about 30% to about 55% by weight solids, depending on the method of application chosen.

Powder coating compositions in accordance with the present invention may be prepared by any well-known method, for example, by dry mixing the components in a mixer or blender followed by compounding in an extruder and granulating, grinding and then screening to obtain a powder of suitable mesh size for powder coating. For powder coatings applications, compositions containing solid crosslinker and backbone resin components are preferred.

Alternatively, some or all of the components may be dissolved in a solvent such as methylene chloride and spray dried by well known techniques.

The coating compositions of this invention may be formulated for use in numerous areas such as original equipment manufacturing (OEM) including automotive coatings, general industrial coatings including industrial maintenance coatings, architectural coatings, can coatings and the like. They are usable as coatings for wire, appliances, automotive parts, furniture, pipes, machinery, and the like. Suitable surfaces include metals such as steel and aluminum, plastics, wood and glass.

Method of Coating

The present coating compositions are utilized by applying the coating to a substrate then curing the so-applied coating to form crosslinked films. Liquid coatings may be applied, for example, by dipping, spraying, padding, brushing, flowcoating, electrocoating or electrostatic spraying. After application, the liquid carrier (e.g., organic solvent and/or water) is generally allowed to partially evaporate to produce a uniform coating on the substrate. Powder coatings may be applied, for example, by means such as a powder gun, electrostatic deposition or deposition from a fluidized bed. After deposition, the powder is typically heated usually to a temperature sufficient to cause the particles to soften, melt, flow and begin to cure. Full curing of the present coating compositions (and curable compositions) requires temperatures generally in the range of from about 25° C. to about 450° C. depending on the components as well as the end use application. In liquid coatings applications, the cure temperature is typically in the range of from about 80° C. to about 160° C. In powder coating applications, the cure temperature is typically in the range of from about 100° C. to about 250° C., preferably between about 110° C. to about 230° C., and more preferably from about 150° C. to about 230° C., and most preferably between about 170° C. to about 200° C. In coil coatings applications, the cure temperature is typically in the range of from about 250° C. to about 450° C. Cure time preferably is in the in the range of from about 1 second to about 30 minutes but may vary depending on the temperature chosen for cure. For example, a fully cured coil coating may be obtained by either curing at 260° C. for 1 minute or by curing at 417° C. for 20 seconds. Typical cure times for liquid and powder coatings are in the in the range of from about 5 minutes to about 30 minutes.

The unexpectedly superior properties of the coating compositions of the invention include the ability to produce films which have low gloss, good hardness, and high solvent and impact resistance.

The coating compositions of the present invention are generally capable of producing durable, substantially surface defect-free films of thicknesses and are particularly suited for applications requiring film thicknesses in the range of from about 1 mil to about 2.5 mils. Such applications include a wide variety of general industry uses including, for example, uses such as primers, primer surfacers, appliance coatings, coatings for outdoor and indoor furniture, lawn and garden equipment, and housing for air-conditioning units, and automotive coatings including, particularly, automotive trim parts, black-outs, windshield wipers, and anti-chip and under the hood areas.

The following Examples are offered to illustrate the various embodiments of the invention and should not be construed as a limitation of the scope thereof.

EXAMPLE 1

A. Preparation of 1,3,5-tris-(2-cyanoethyl)isocyanurate

To a 1000 ml round bottom flask 64.5 g of cyanuric acid along with 300 ml of water was added. A stir bar was added, and then 51 g of triethylamine was charged. The solution was stirred for 30 minutes at room temperature. Then 87 g of acrylonitrile was added to the solution. The solution was heated under reflux for 12 hours. The solution was then cooled to room temperature and the precipitated solid was filtered off. The dried solid weighed 133 g (92%). The melting point range was 222° C.–224° C.

B. Preparation of 1,3,5-tris-(2-carboxyethyl)isocyanurate

To a 500 ml round bottom flask was added 94 g of tris-(2-cyanoethyl)isocyanurate along with 200 ml of a 36% solution of hydrochloric acid. The solution was heated under reflux for 4 hours, filtered through a fritted funnel, and allowed to cool to room temperature. The crystals obtained weighed 105 g (98%). The melting point range was 226°–228° C.

EXAMPLE 2

Using the following general procedure, eighteen powder coated panels were prepared as follows: 1,12-dodecanedioic acid (DDA) or dl-malic acid, 1,3,5-tris-(2-carboxyethyl) isocyanurate (TCI), Almatex® PD-7610 (PD-7610), and the optional ingredients listed in Tables 1–9 were melt-mixed in a two roll mill at approximately 125° C. for about 5 minutes. The resultant mixture was ground and classified to a powder paint of a particle size of 35 microns (plus or minus 10 microns). The resulting powder coating composition was applied to Bonderite® 1000 panels (Parker Chemical Company) by electrostatic spraying. The coated panels were then placed horizontally in a mechanical forced stream convection oven at the specified temperature/time cure cycle and cured. Preparative details and physical and resistance properties of the cured coatings are summarized in Tables 1 to 9.

TABLE 1

|  | A | B |
|---|---|---|
| TCI/DDA | 0/100 | 0/100 |
| DDA | 13.80 | 13.80 |
| PD-7610 | 66.20 | 66.20 |
| R960-48 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth | smooth |
| Film Thickness (mils) | 1.5/2.4 | 0.7/1.4 |
| KHN | 13.9 | 13.9 |
| Pencil Hardness | HB-F | HB-F |
| Impact F/R (in. lbs.) | 20/5 | 50/5 |
| Gloss 60 (deg) | 89.6 | 88.1 |
| 20 (deg) | 75.0 | 69.6 |

TABLE 2

|  | C | D |
|---|---|---|
| TCI/DDA | 5/95 | 5/95 |
| TCI | 0.69 | 0.69 |
| DDA | 13.11 | 13.11 |
| TCI + DDA | 13.80 | 13.80 |
| PD-7610 | 62.00 | 62.00 |
| R 960 | 20.00 | 20.00 |
| RESIFLOW P-67 | 1.00 | 1.-00 |
| Substrate | BO 1000 | BO 1000 |
| Bake Temp (° C.) | 175 | 190 |
| Bake Time (Min) | 20 | 20 |
| Mek Rubs | 200+ | 200+ |

TABLE 2-continued

|  | C | D |
| --- | --- | --- |
| Film Appearance | smooth | smooth |
| Film Thickness (mils) | 1.1/2.3 | 1.0/2.5 |
| KHN | 14.5 | 14.2 |
| Pensil Hardness | HB-F | HB-F |
| Impact F/R (in. lbs.) | 30/5 | 40/5 |
| Gloss 60 (deg) | 89.1 | 87.5 |
| 20 (deg) | 69.7 | 56.9 |

TABLE 3

|  | E | F |
| --- | --- | --- |
| TCI/DDA | 10/90 | 10/90 |
| TCI | 1.38 | 1.38 |
| DDA | 12.42 | 12.42 |
| TCI + DDA | 13.80 | 13.80 |
| PD-7610 | 66.20 | 66.20 |
| R960 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | smooth | smooth |
| Film Thickness (mils) | 1.7/3.3 | 1.5/2.6 |
| KHN | 13.1 | 13.7 |
| Pencil Hardness | HB-F | HB-F |
| Impact F/R (in. lbs.) | 30/5 | 30/5 |
| Gloss 60 (deg) | 87.0 | 82.8 |
| 20 (deg) | 55.8 | 42.6 |

TABLE 4

|  | G | H |
| --- | --- | --- |
| TCI/DDA | 20/80 | 20/80 |
| TCI | 2.80 | 2.80 |
| DDA | 11.00 | 11.00 |
| TCI + DDA | 13.80 | 13.80 |
| PD-7610 | 66.20 | 66.20 |
| R960 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth | smooth |
| Film Thickness (mils) | 1.0/1.7 | 1.1/1.8 |
| KHN | 15.0 | 15.4 |
| Pencil Hardness | HB-F | HB-F |
| Impact F/R (in. lbs.) | 40/5 | 40.5 |
| Gloss 60 (deg) | 75.8 | 67.0 |
| 20 (deg) | 32.0 | 23.1 |

TABLE 5

|  | I | J |
| --- | --- | --- |
| TCI/DDA | 50/50 | 50/50 |
| TCI | 6.90 | 6.90 |
| DDA | 6.90 | 6.90 |
| TCI + DDA | 13.80 | 13.80 |
| PD-7610 | 66.20 | 66.20 |
| R960-48 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth | smooth |
| Film Thickness (mils) | 1.2/2.0 | 1.0/2.1 |

TABLE 5-continued

|  | I | J |
| --- | --- | --- |
| KHN | 14.0 | 15.4 |
| Pencil Hardness | H-2h | H-2H |
| Impact F/R (in. lbs.) | 20/5 | 30/5 |
| Gloss 60 (deg) | 52.1 | 44.0 |
| 20 (deg) | 12.6 | 9.8 |

TABLE 6

|  | K | L |
| --- | --- | --- |
| TCI/DDA | 80/20 | 80/20 |
| TCI | 11.00 | 11.00 |
| DDA | 2.80 | 2.80 |
| TCI + DDA | 13.80 | 13.80 |
| PD-7610 | 66.20 | 66.20 |
| R960-48 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth matte | smooth matte |
| Film Thickness (mils) | 1.2/2.1 | 1.4/2.1 |
| KHN | 15.7 | 17.0 |
| Pencil Hardness | H-F | H-F |
| Impact F/R (in. lbs.) | 30/5 | 30/5 |
| Gloss 60 (deg) | 42.3 | 33.6 |
| 20 (deg) | 8.7 | 6.7 |

TABLE 7

|  | M | N |
| --- | --- | --- |
| TCI/DDA | 90/10 | 90/10 |
| TCI | 12.40 | 12.40 |
| DDA | 1.40 | 1.40 |
| TCI + DDA | 13.80 | 13.80 |
| PD-7610 | 66.20 | 66.20 |
| R960-48 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth matte | smooth matte |
| Film Thickness (mils) | 1.7/2.6 | 1.3/2.5 |
| KHN | 16.7 | 18.1 |
| Pencil Hardness | H-2H | H-2H |
| Impact F/R (in. lbs.) | 20/5 | 30/5 |
| Gloss 60 (deg) | 43.9 | 35.0 |
| 20 (deg) | 9.2 | 7.1 |

TABLE 8

|  | O | P |
| --- | --- | --- |
| TCI/DDA | 100/0 | 100/0 |
| TCI | 13.80 | 13.80 |
| PD-7610 | 66.20 | 66.20 |
| R960-48 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth | smooth |
| Film Thickness (mils) | 1.0/1.8 | 1.5/1.9 |
| KHN | 18.1 | 16.8 |
| Pencil Hardness | H-2H | H-2H |
| Impact F/R (in. lbs.) | 20/5 | 20/5 |

TABLE 8-continued

|  | O | P |
|---|---|---|
| Gloss 60 (deg) | 68.3 | 61.6 |
| 20 (deg) | 24.6 | 18.0 |

TABLE 9

|  | Q | R |
|---|---|---|
| TCI/dl-Malic Acid | 63/37 | 63/37 |
| dl-Malic Acid | 4.02 | 4.02 |
| TCI | 6.90 | 6.90 |
| dl-Malic Acid + TCI | 10.92 | 10.92 |
| PD-7610 | 66.20 | 66.20 |
| R960 | 20.00 | 20.00 |
| RESIFLOW P-67 | 1.00 | 1.00 |
| Substrate | BO 1000 | BO 1000 |
| Bake Temp (° C.) | 175 | 190 |
| Bake Time (Min) | 20 | 20 |
| Mek Rubs | 200+ | 200+ |
| Film Appearance | smooth matte some microcrafters | smooth matte some microcrafters |
| Film Thickness (mils) | 1.5/2.5 | 1.2/2.1 |
| KHN | 15.6 | 16.1 |
| Pencil Hardness | H-2H | H-2H |
| Impact F/R (in. lbs.) | 20/5 | 30/5 |
| Gloss 60 (deg) | 50.3 | 42.6 |
| 20 (deg) | 12.3 | 9.7 |

Although the present invention has been described with reference to certain preferred embodiments, it is apparent that modifications and variations thereof may be made by those skilled in the art without departing from the scope of the invention as defined by the appended claims.

What is claimed is:

1. A curable composition, comprising:
   (a) a carboxy-functional crosslinker component comprising:
      (i) 1,3,5-tris-(2-carboxyethyl)isocyanurate and/or a salt thereof, and
      (ii) a dicarboxylic acid crosslinking agent and/or a salt thereof; and
   (b) a resin component comprising a polyfunctional epoxy compound.

2. The curable composition of claim 1, wherein the weight ratio of (a)(i):(a)(ii) is in the range of from about 20:80 to about 98:2.

3. The curable composition of claim 1, wherein the dicarboxylic acid crosslinking agent is represented by the formula:

HOOC—A—COOH wherein A is a hydrocarbylene group of 1 to 22 carbon atoms.

4. The curable composition of claim 1, wherein the dicarboxylic acid is 1,12-dodecanedioic acid.

5. The curable composition of claim 1, wherein the polyfunctional epoxy compound is a copolymer derived from the copolymerization of an epoxy group-containing olefinically-unsaturated monomer and an epoxy-free olefinically-unsaturated monomer.

6. The curable composition of claim 5, wherein the copolymer has a molecular weight (Mw) in the range of from about 1,000 to about 30,000; an epoxy equivalent weight of from about 50 to about 5,000; and a glass transition temperature of from about −20° C. to about 120° C.

7. The curable composition of claim 1, further comprising a cure catalyst.

8. The curable composition of claim 7, wherein the catalyst is present in an amount in the range of from about 0.01 weight percent to about 5.0 weight percent of the total weight of the curable composition.

9. The curable composition of claim 1, wherein the weight ratio of the resin component (b) to the carboxy-functional crosslinker component (a) is in the range of from about 0.5:1 to about 2:1.

10. A curable powder coating composition comprising:
    (a) a carboxy-functional crosslinker component comprising:
       (i) 1,3,5-tris-(2-carboxyethyl)isocyanurate and/or a salt thereof, and
       (ii) a dicarboxylic acid crosslinking agent and/or a salt thereof; and
    (b) a resin component comprising a polyfunctional epoxy compound, components (a) and (b) being solid at ambient temperature.

11. The curable powder composition of claim 10, wherein the weight ratio of (a)(i):(a)(ii) is in the range of from about 20:80 to about 98:2.

12. The curable powder composition of claim 10, wherein the dicarboxylic acid crosslinking agent is represented by the formula:

HOOC—A—COOH wherein A is a hydrocarbylene group of 1 to 22 carbon atoms.

13. The curable powder composition of claim 10, wherein the dicarboxylic acid is 1,12-dodecanedioic acid.

14. The curable powder composition of claim 10, wherein the polyfunctional epoxy compound is a copolymer derived from the copolymerization of an epoxy group-containing olefinically-unsaturated monomer and an epoxy-free olefinically-unsaturated monomer.

15. The curable powder composition of claim 14, wherein the copolymer has a molecular weight (Mw) in the range of from about 1,000 to about 30,000; an epoxy equivalent weight of from about 50 to about 5,000; and a glass transition temperature of from about −20° C. to about 120° C.

16. The curable powder composition of claim 10, further comprising a cure catalyst.

17. The curable powder composition of claim 16, wherein the catalyst is present in an amount in the range of from about 0.01 weight percent to about 5.0 weight percent of the total weight of the curable composition.

18. The curable powder composition of claim 10, wherein the weight ratio of the resin component (b) to the carboxy-functional crosslinker component (a) is in the range of from about 0.5:1 to about 2:1.

* * * * *